United States Patent
Eftekharzadeh (10) Patent No.: US 11,028,611 B2
(45) Date of Patent: Jun. 8, 2021

(54) UNDERGROUND WATERSILO

(71) Applicant: Shahriar Eftekharzadeh, Torrance, CA (US)

(72) Inventor: Shahriar Eftekharzadeh, Torrance, CA (US)

(*) Notice: Subject to any disclaimer, the term of this patent is extended or adjusted under 35 U.S.C. 154(b) by 231 days.

(21) Appl. No.: 16/503,463

(22) Filed: Jul. 3, 2019

(65) Prior Publication Data
US 2019/0330872 A1  Oct. 31, 2019

(51) Int. Cl.
*E04H 7/02* (2006.01)
*E03F 1/00* (2006.01)

(52) U.S. Cl.
CPC ............ *E04H 7/02* (2013.01); *E03F 1/002* (2013.01)

(58) Field of Classification Search
CPC ... E04H 7/02; E03F 1/002; E02D 3/00; E02B 3/16; B65G 5/00; F17C 2203/00; F17C 2203/0604; F17C 2203/0607
USPC ..... 405/233, 236, 245, 52, 53, 154, 184, 55, 405/157, 51, 37; 137/356; 52/19.21, 52/169.1, 169.6, 169.7, 169.8, 192, 128, 52/133, 135, 79.1, 745.1; 220/4.12, 220/560.03, 567.1, 567.2, 4.13, 23.4, 601, 220/604, 608, 657, 659, 661, 669, 670, 220/672, 673
See application file for complete search history.

(56) References Cited

U.S. PATENT DOCUMENTS

| | | | | |
|---|---|---|---|---|
| 3,285,014 A * | 11/1966 | Nachshen | ............... | F17C 3/005 405/53 |
| 3,745,738 A * | 7/1973 | Singer | ................... | E02D 29/124 52/741.3 |
| 5,026,214 A * | 6/1991 | Beck, III | ................ | E02D 15/04 405/233 |
| 5,333,465 A * | 8/1994 | McBride | ................. | F17C 1/007 137/264 |
| 5,806,702 A * | 9/1998 | Sabo | ....................... | E03F 11/00 220/4.12 |
| 6,183,166 B1 * | 2/2001 | Schellhorn | ............... | E02D 5/38 405/233 |
| 2007/0206995 A1 * | 9/2007 | Fox | .......................... | E02D 5/46 405/233 |
| 2010/0154332 A1 * | 6/2010 | Shockley | .................. | E04C 3/22 52/223.3 |
| 2012/0155959 A1 * | 6/2012 | Lawry | ..................... | E03F 1/002 404/4 |
| 2013/0206662 A1 * | 8/2013 | Wilhelms | .................. | E03F 1/00 210/170.03 |
| 2013/0343819 A1 * | 12/2013 | Sharp | ...................... | E02D 29/14 405/52 |
| 2016/0032606 A1 * | 2/2016 | Simmons | ................ | F17C 3/022 52/195 |
| 2016/0305108 A1 * | 10/2016 | Eftekharzadeh | .......... | E03B 3/03 |

* cited by examiner

*Primary Examiner* — Justin M Jonaitis (57) ABSTRACT

A method for constructing silos underground to store water.

2 Claims, 12 Drawing Sheets

UNDERGROUND WATERSILO

FIELD OF THE INVENTION

The present invention is in the field of devices for storing materials. More specifically, the present invention relates to the storage of water underground.

BACKGROUND OF THE INVENTION

Silos are tall cylindrical aboveground structures that have long been used for storage of grains. Their main advantage over conventional buildings for storage is their small footprint for a given storage volume because of vertical construction, which provides flexibility in siting and accommodating where conventional buildings would not be feasible.

Recent environmental needs and regulations are mandating the storage and treatment of urban stormwater runoff as an imperative driven by water scarcity and regulations to prevent and mitigate pollution. The volume of the stormwater runoff is often very large requiring large plots of land for storage facilities, which are hard to find in most urban areas.

Therefore, there is a need for a simple and practical method of storing stormwater runoff in urban areas that resembles silos in flexibility and land requirement.

SUMMARY OF THE INVENTION

The present invention provides a solution to the above need by applying the experience of silo storage used for grains to urban stormwater storage, with one major difference. Instead of erecting silos above ground, the present invention discloses a method of constructing silos underground. The method may be used for constructing underground silos in the public right of way where the problem of land availability is resolved.

The underground silo of the present invention is constructed using a vertical drill that excavates out the ground and removes the native soils that occupy the total volume of the intended silo and foundation underground. The action produces a cylindrical vertical hole underground having a diameter that is the outside diameter of the intended silo and depth that is larger than the total height of intended underground silo, including foundation.

Having excavated the vertical hole, the combined foundation and floor of intended underground silo is formed by pouring a predetermined volume of wet concrete into the vertical hole, filling it up to a certain depth from bottom. This is followed by inserting a closed-bottom cylindrical form in the vertical hole and sinking it to the design level inside the wet concrete at the bottom. The cylindrical form has a diameter that is exactly the same as the inside diameter of the silo, and height that is at least the same as the height of intended underground silo. The bottom of the closed-bottom cylindrical form has the design geometric shape of the silo floor and the sink level is the design floor elevation of the underground silo.

The cylindrical form is weighted down by appropriate means to make it sink down into the wet concrete to the level that creates the design thickness of concrete between the bottom of the vertical hole and the bottom of the silo. The action displaces a certain volume of wet concrete into the annulus between the vertical hole and the cylindrical form at the bottom.

With the cylindrical form in place, wet concrete is poured in the annulus between the vertical hole and the cylindrical form. This may be done after allowing the foundation concrete to set to avoid increase in buoyant forces on the form. Alternatively, the form may be physically restrained from movement or proportionally weighted down as the concrete is poured. The pouring of wet concrete in annulus continues until the level of wet concrete reaches the top of the wall of the intended underground silo, a certain depth below ground surface. This marks the location of the base of the silo roof leaving sufficient room above for construction or installation of the silo roof while providing sufficient space for backfill as required.

Once the concrete poured in the annulus is set, the cylindrical form may be removed to leave a constructed concrete silo underground. Alternatively, the cylindrical form may be left in place, in which case it must be hollow having the same inside diameter as the underground silo, made of materials of sufficient durability, chemical composition, and stability that conform with codes and regulations for water storage.

Another technique that could be employed for constructing the underground silo of the present invention is to use what is known in the construction industry as slip forming. Using this technique, the cylindrical form is gradually lifted up at a precise rate as the concrete is being poured giving the concrete sufficient time to set. This technique delivers the completed silo underground up to the base of the silo roof with the form removed.

The silo roof may take a variety of shapes and forms. It may be a flat circular roof such as a reinforced concrete slab resting over the cylindrical concrete wall covering over the silo, or it may be conical as in aboveground silos, or dome shaped. Regardless, the silo roof requires engineering and structural design to withstand the dead and live loads over the roof up to ground level including overburden and traffic loads.

The silo roof is fitted with at least one access opening of required dimensions for man entry if required and for installation and removal of equipment such as submersible pump or suction tube to remove the stored water. The silo roof may also be fitted with other openings and fittings for water inflow, vent pipe, and conduits for discharge pipe, electrical cables, and instrumentation.

It is an object of this invention to provide a simple and constructible method of constructing a silo underground for storage of water.

It is an object of this invention to provide improved elements and arrangements by apparatus for the purposes described thereof, which is comparable in cost with existing systems, dependable, and fully effective in accomplishing its intended purposes.

These and other objects of the present invention will become readily apparent upon further review of the following specification and drawings.

DETAILED DESCRIPTION

Figure 1:
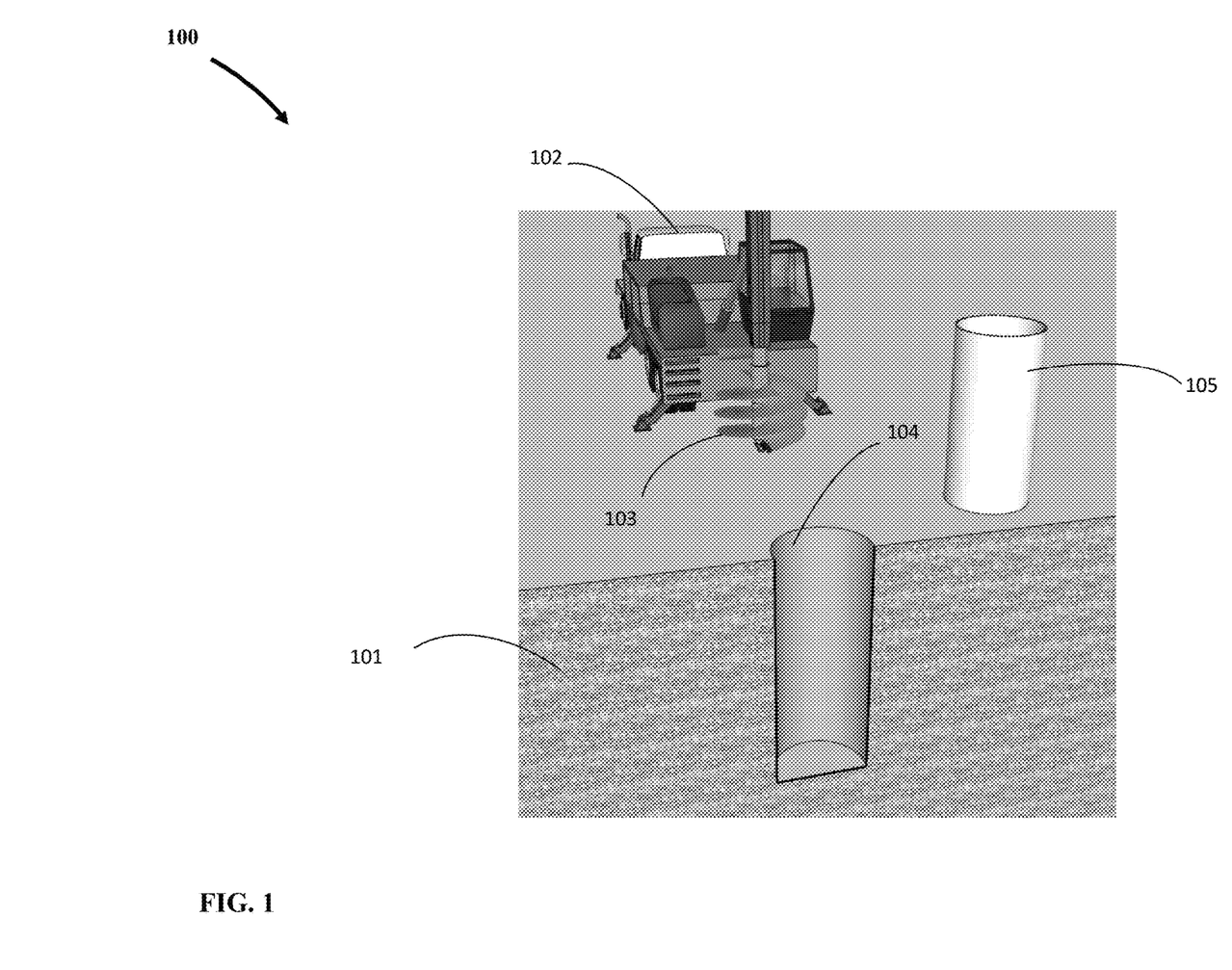
FIG. 1 is a basic field construction setup showing cut section of ground and vertical hole excavated with drill rig, and cylindrical form to be used for constructing the underground silo of the present invention.

Referring to FIG. 1, there is shown a basic field construction setup exposing cut section of ground 101 and vertical hole 104 of diameter equal to outside diameter of underground silo of the present invention 100 excavated with drill rig 102 using drill tool 103. FIG. 1 also shows cylindrical form 105 having outside diameter that is same as the inside diameter of the underground silo of the present invention 100. The bottom of form 105 is closed and sealed making form 105 impermeable on all sides except the top.

Figure 2:
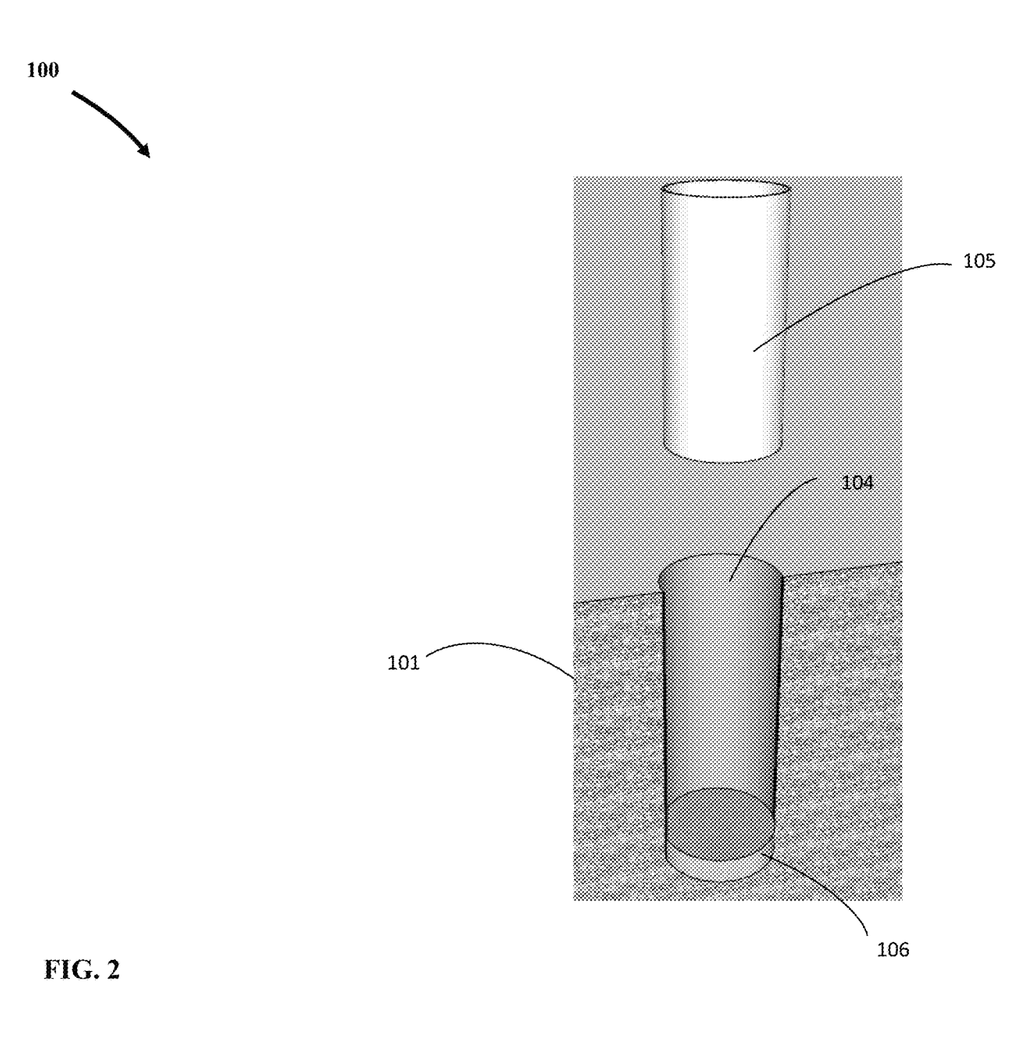
FIG. 2 shows foundation concrete poured in vertical hole and cylindrical form centered above prior to being lowered down inside.

FIG. 2 shows foundation concrete 106 having been poured inside vertical hole 104 and cylindrical form 105 centered above to be lowered down inside. The volume and formulation of foundation concrete 106 is designed to provide water impermeability, sufficient strength for structural support, fluidity for movement into annulus between form 105 and vertical hole 104, and partial counter weight as ballast against buoyant forces and floatation of finished underground silo.

Figure 3:
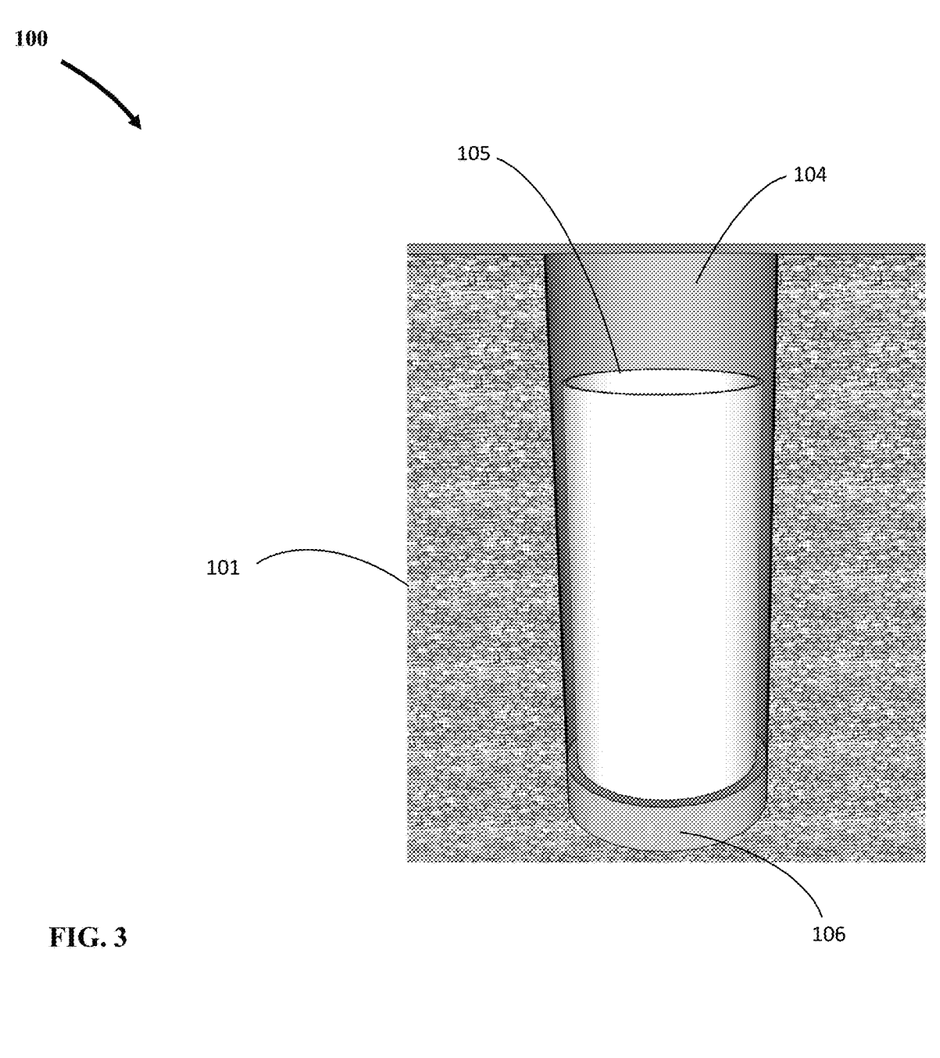
FIG. 3 shows cylindrical form lowered down inside on center of vertical hole floating on wet foundation concrete.

FIG. 3 show cylindrical form 105 lowered down inside on center of vertical hole 104 floating on wet foundation concrete 106. Having a closed bottom, form 105 sinks down inside wet concrete 106 by a certain depth in accordance with its buoyancy properties, which given a fixed diameter, may be controlled by increasing the weight of form 105.

Figure 4:
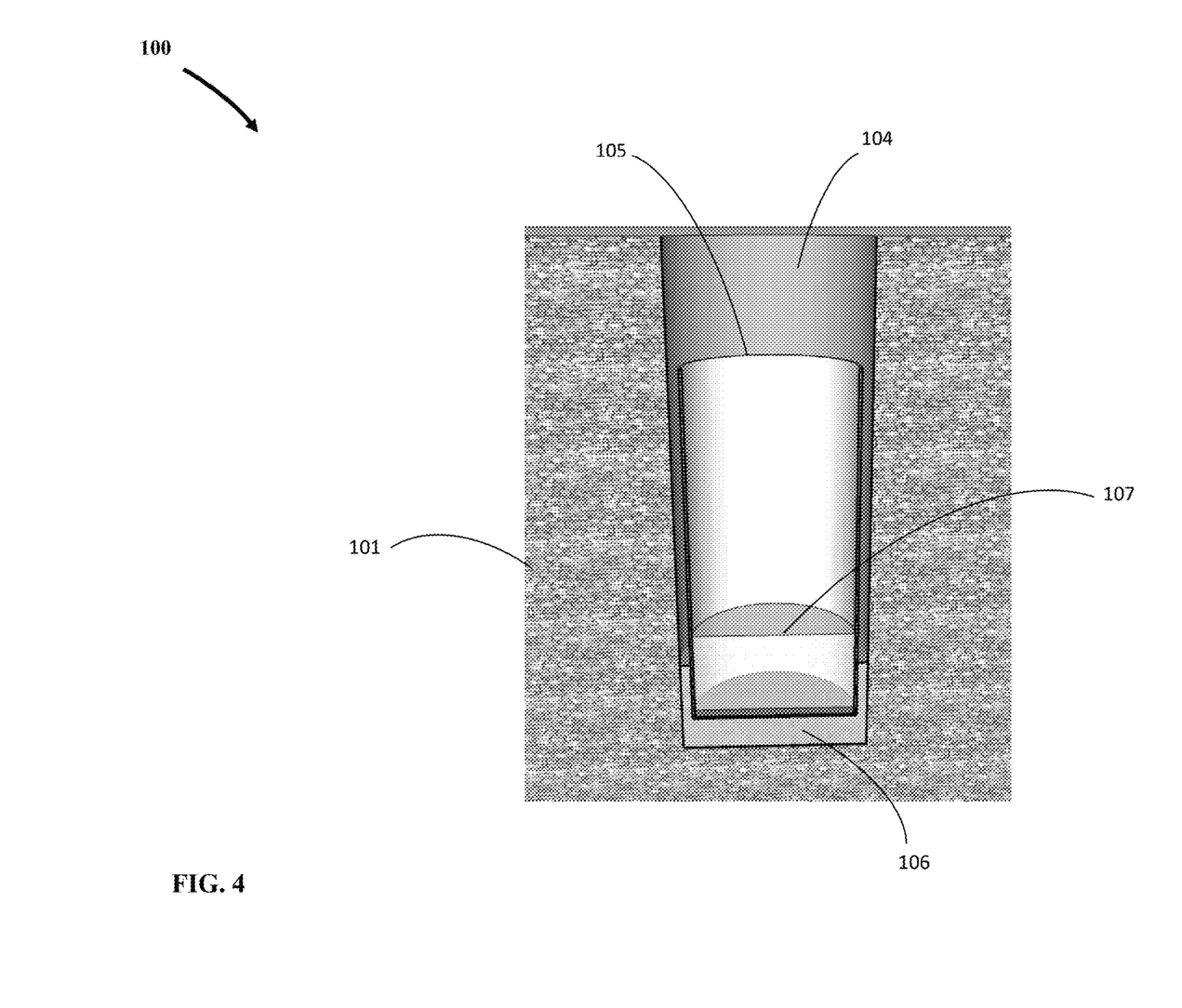
FIG. 4 shows cut section of water in cylindrical form sunken down in wet foundation concrete and concrete forced up into annulus from bottom.

FIG. 4 shows cut section of cylindrical form 105 with water 107 inside that adds weight to form 105 by exact amount needed to sink form 105 in wet foundation concrete 106 to desired level. Sunken form 105 in wet concrete 106 has forced up certain design volume of wet concrete 106 into annulus between form 105 and vertical hole 104 from bottom. At this stage, foundation concrete 106 may be allowed to set to firmly grip and fix form 105 in position.

Figure 5:
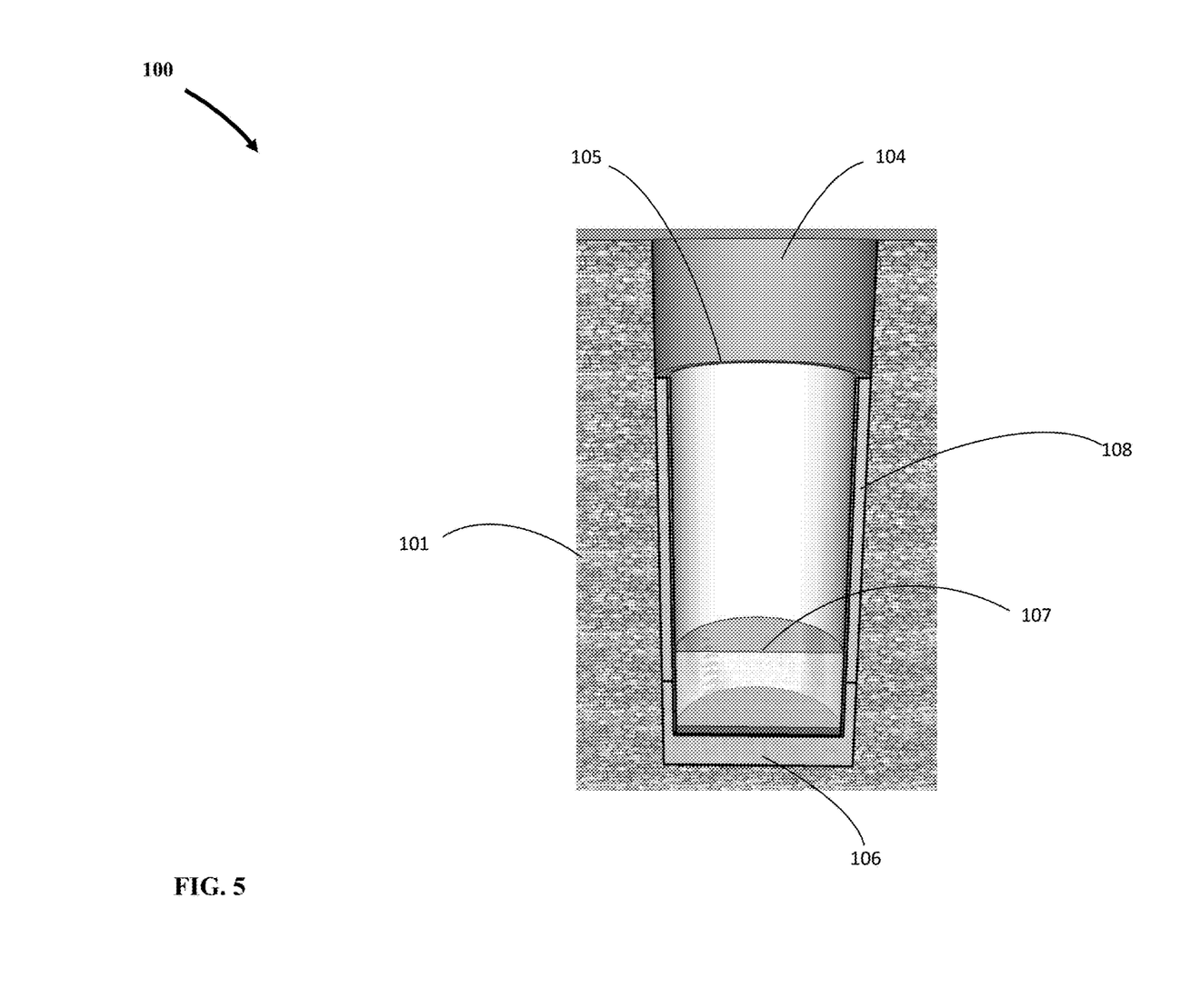
FIG. 5. shows annulus between vertical hole and cylindrical form filled with poured wet concrete up to top of silo wall.

FIG. 5. shows annulus between vertical hole 104 and cylindrical form 105 filled with silo wall concrete 108 up to top of underground silo, which happens to coincide with top of cylindrical form 105. This means that form 105 has been selected to have the exact same height of underground silo wall, which is not a requirement if form 105 is to be removed. Formulation of silo wall concrete 108 is governed by requirements for water impermeability, strength, and fluidity to fully fill annulus between vertical hole 104 and cylindrical form 105. If foundation concrete 106 has been allowed to set, then there are no buoyant forces on form 105 from wet silo wall concrete 108, meaning that no further ballasting of form 105 is required during pouring of wet concrete 108. If foundation concrete 106 has not been allowed to set, then the pouring of wet concrete 108 increases buoyancy forces on form 105, which may be countered by additional water 107 inside form 105 to maintain fixed position.

Figure 6:
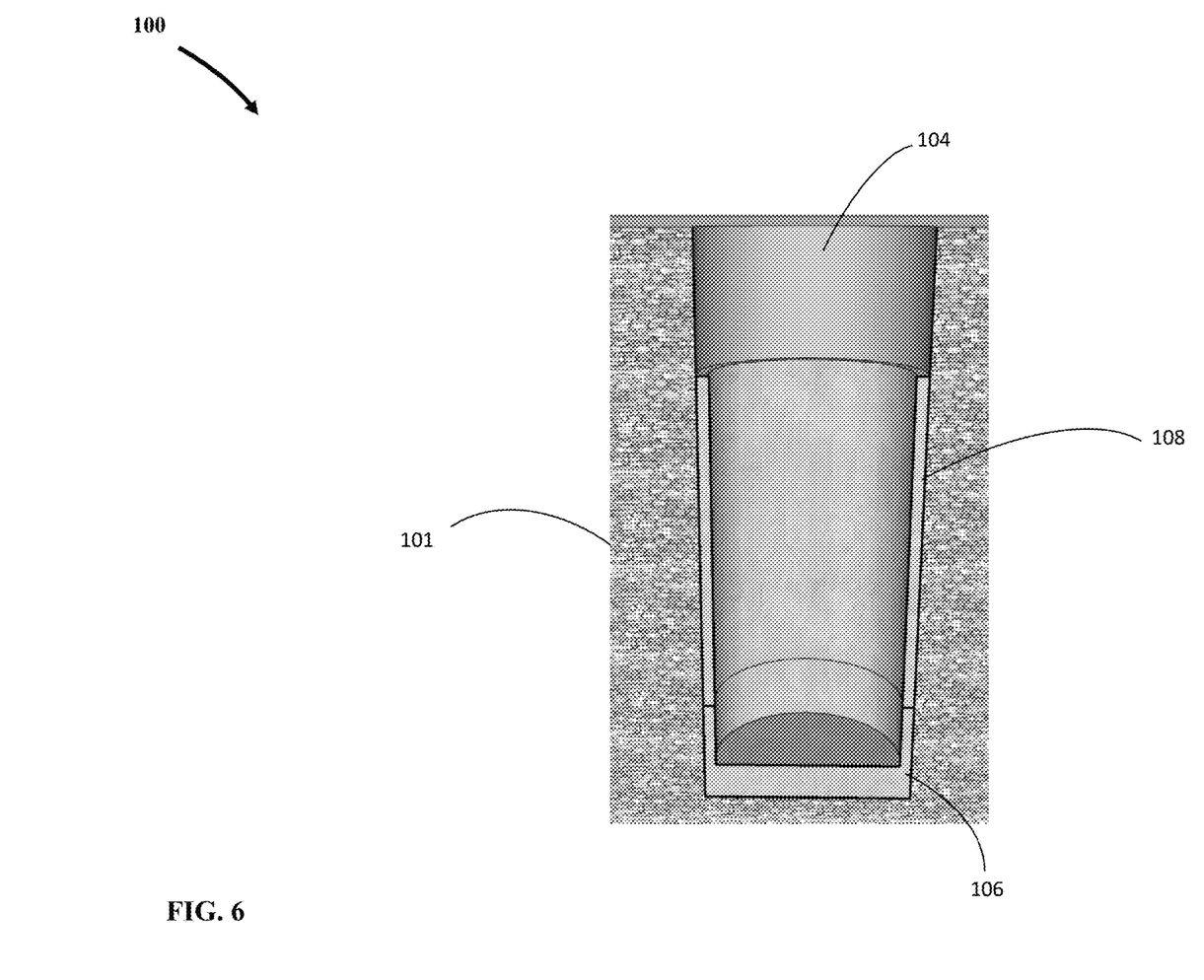
FIG. 6 show cylindrical form having been removed leaving formed concrete silo underground.

FIG. 6 shows silo wall concrete 108 having been set and cylindrical form 105 of FIG. 5 having been removed leaving formed concrete underground silo 100. Thickness of silo wall concrete 108, which equals the difference between radii of vertical hole 104 and cylindrical form 105 of FIG. 5, has been determined by requirements to provide impermeability, withstand crushing forces by earth pressures below ground, and to provide sufficient counterweight against potential buoyant forces due to existence of high groundwater, in combination with weight of foundation concrete 106.

Figure 7:
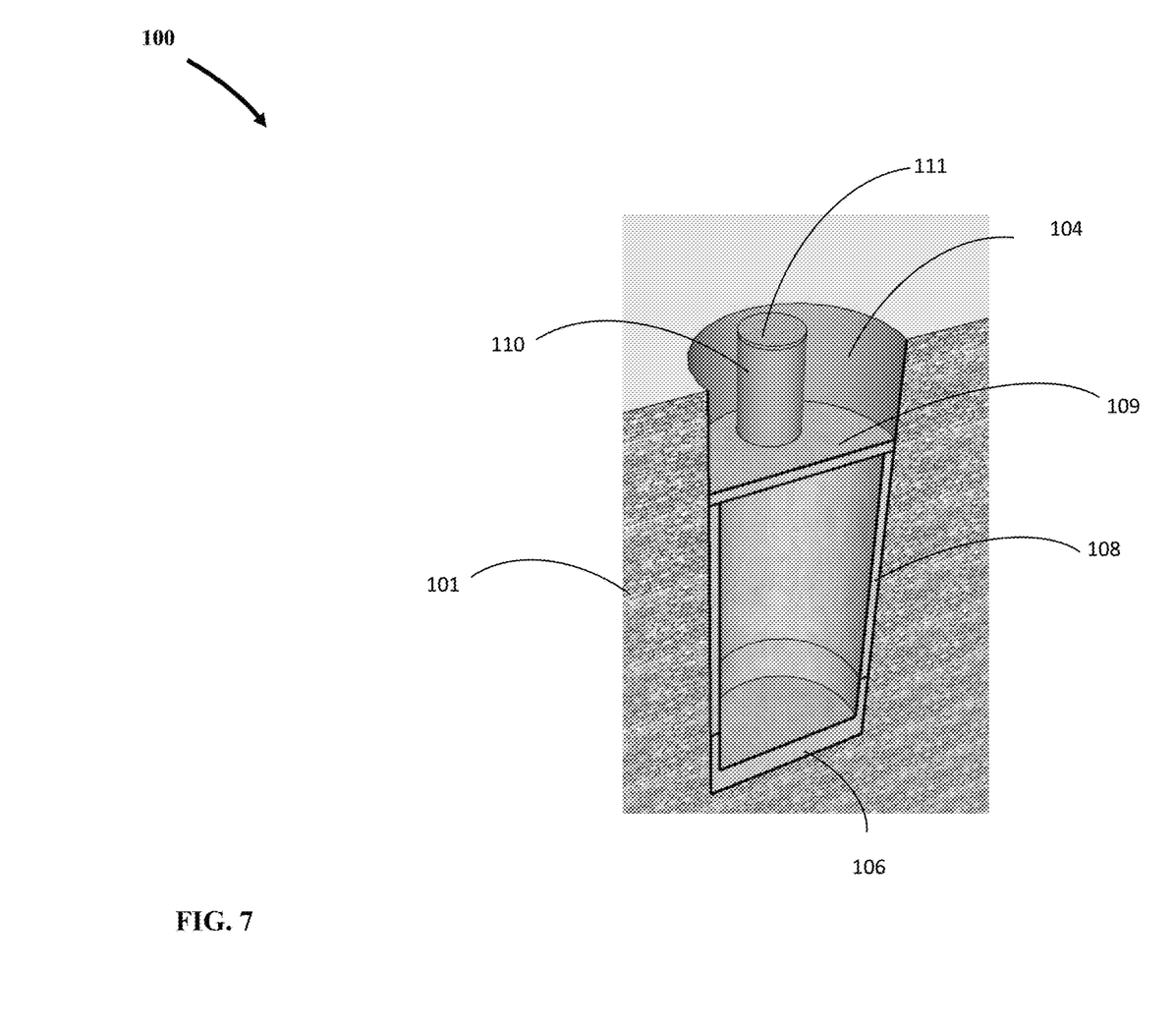
FIG. 7 shows installed load bearing flat roof with access into underground silo.

FIG. 7 shows load bearing flat roof 109 equipped with access conduit 110 and cover 111 resting on silo wall 108. Top surface of silo wall 108 serves as support for flat roof 109 transferring forces down to silo foundation 106. Flat roof 109 has been structurally designed to support overburden dead and live loads on top. Access conduit 110 is of sufficient size for a variety of purposes that may include, man entry, equipment installation and retrieval, lateral connections, etc. Roof 109 may also be fitted with other access conduits (not shown) for purposes that may include ventilation, pipe connections for water inflow, outflow, and electrical conduit routing, etc.

Figure 8:
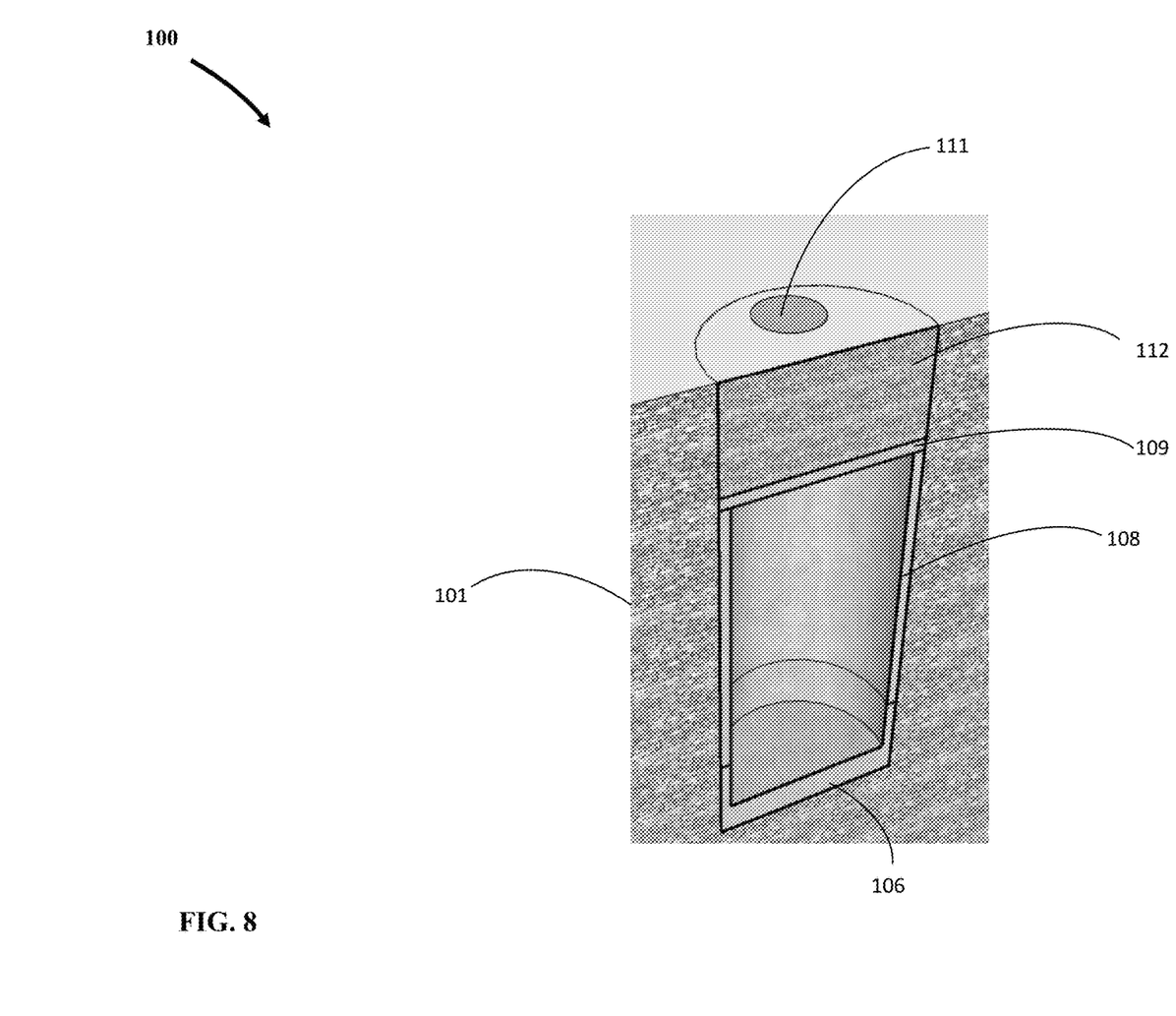
FIG. 8 shows vertical hole above load bearing flat roof having been backfilled and compacted.
Figure 9:
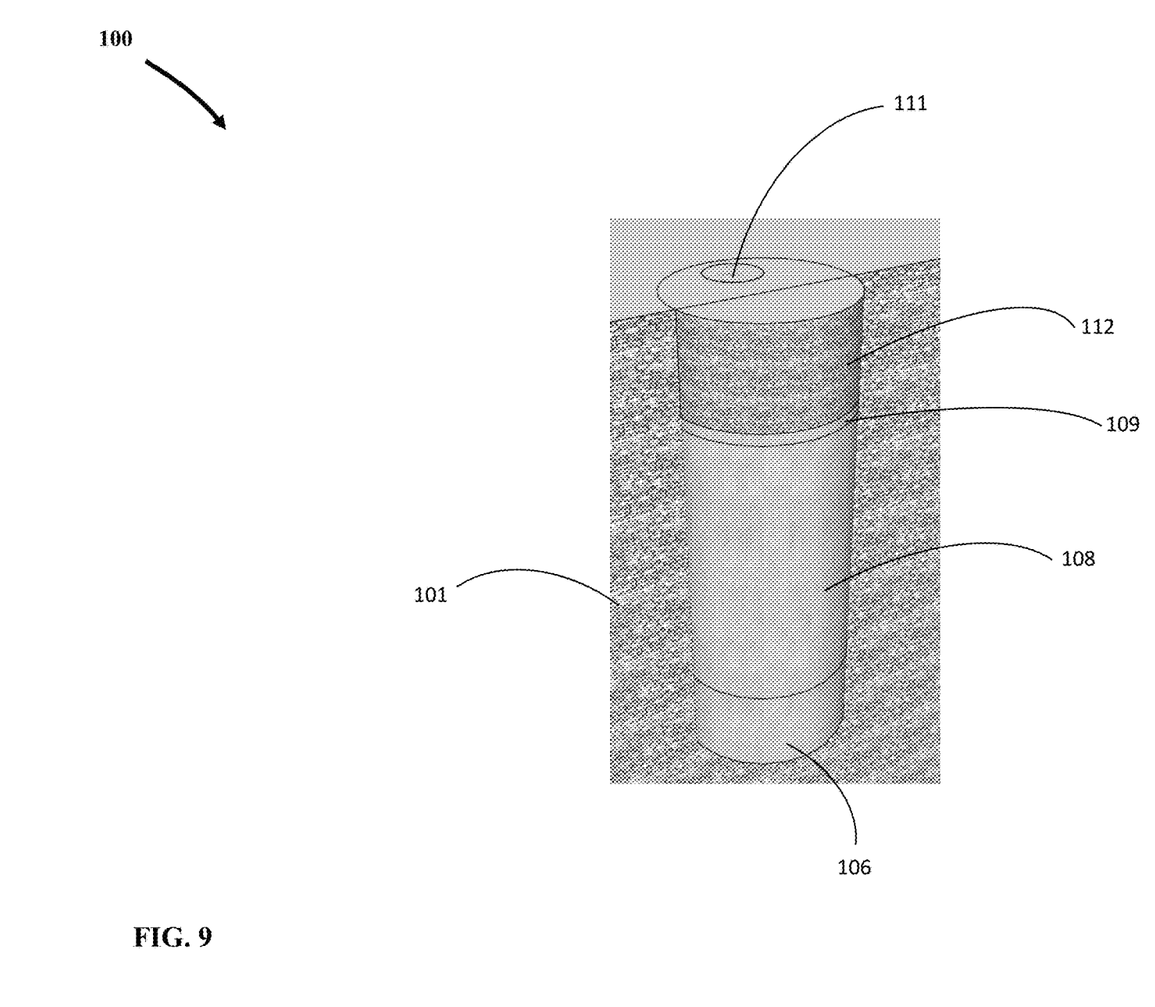
FIG. 9 shows exterior surface of underground silo.

FIG. 8 shows backfill 112 having been placed inside vertical hole 104 of FIG. 7, above load bearing flat roof 109 and compacted, thus completing construction of underground silo 100. FIG. 9 is uncut section of underground silo 100 of present invention showing the exterior surface in contact with native ground.

Figure 10:
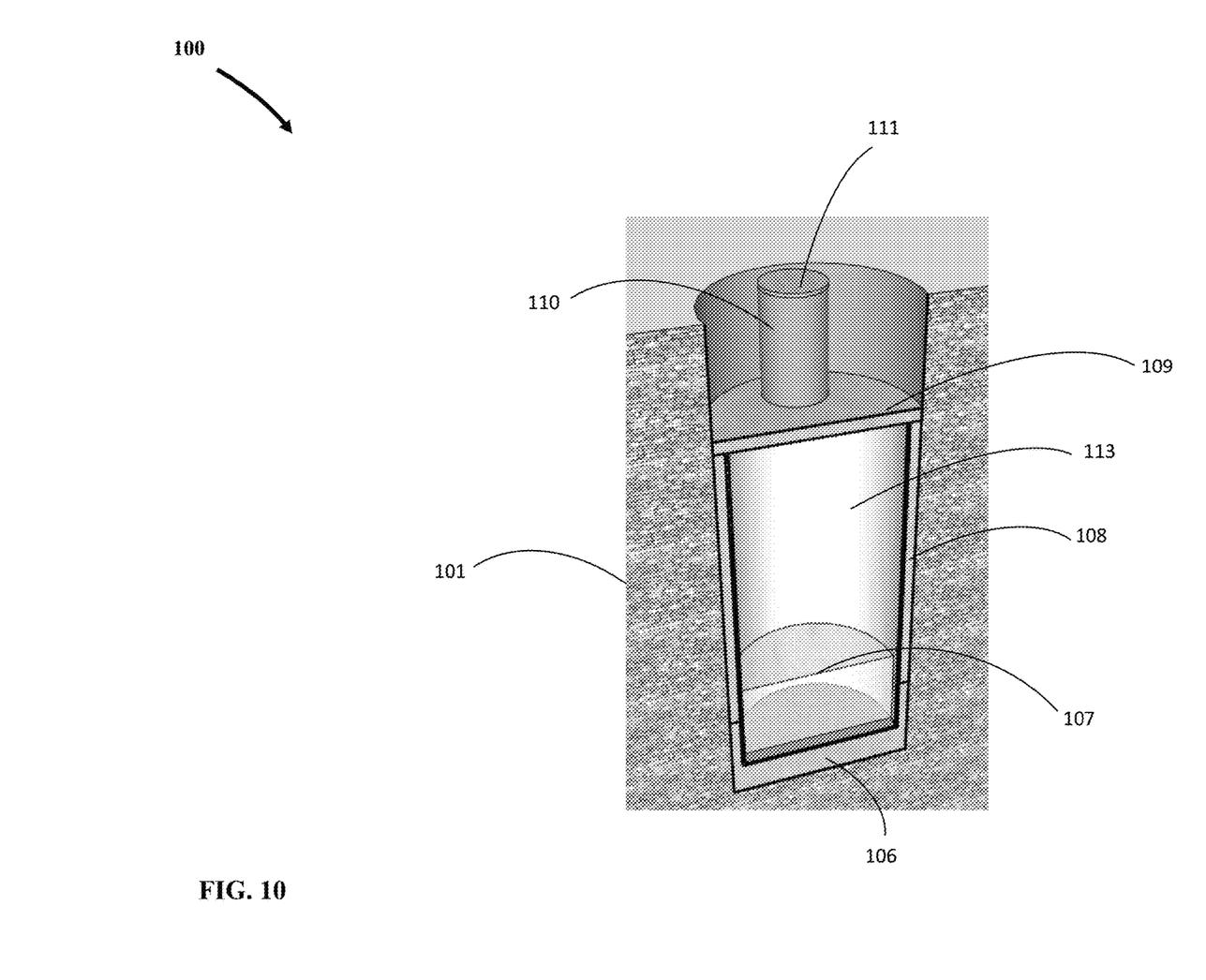
FIG. 10 shows alternative method that leaves form in silo.

FIG. 10 shows alternative method of continuing construction of silo 100 from stage shown in FIG. 5, wherein sacrificial form 113 has been used in lieu of removable form 105 shown in FIGS. 1 through 5, and thus has been left in place to form interior surface/lining of silo 100. With this alternative method, length of form 113 must be exactly same as height of silo wall, and water 107 may be left inside. Using this alternative, sacrificial form 113 is made of materials of sufficient durability, chemical composition, and stability that conform with codes and regulations for water storage. With this alternative the next step in construction is as shown in FIG. 8.

Figure 11:
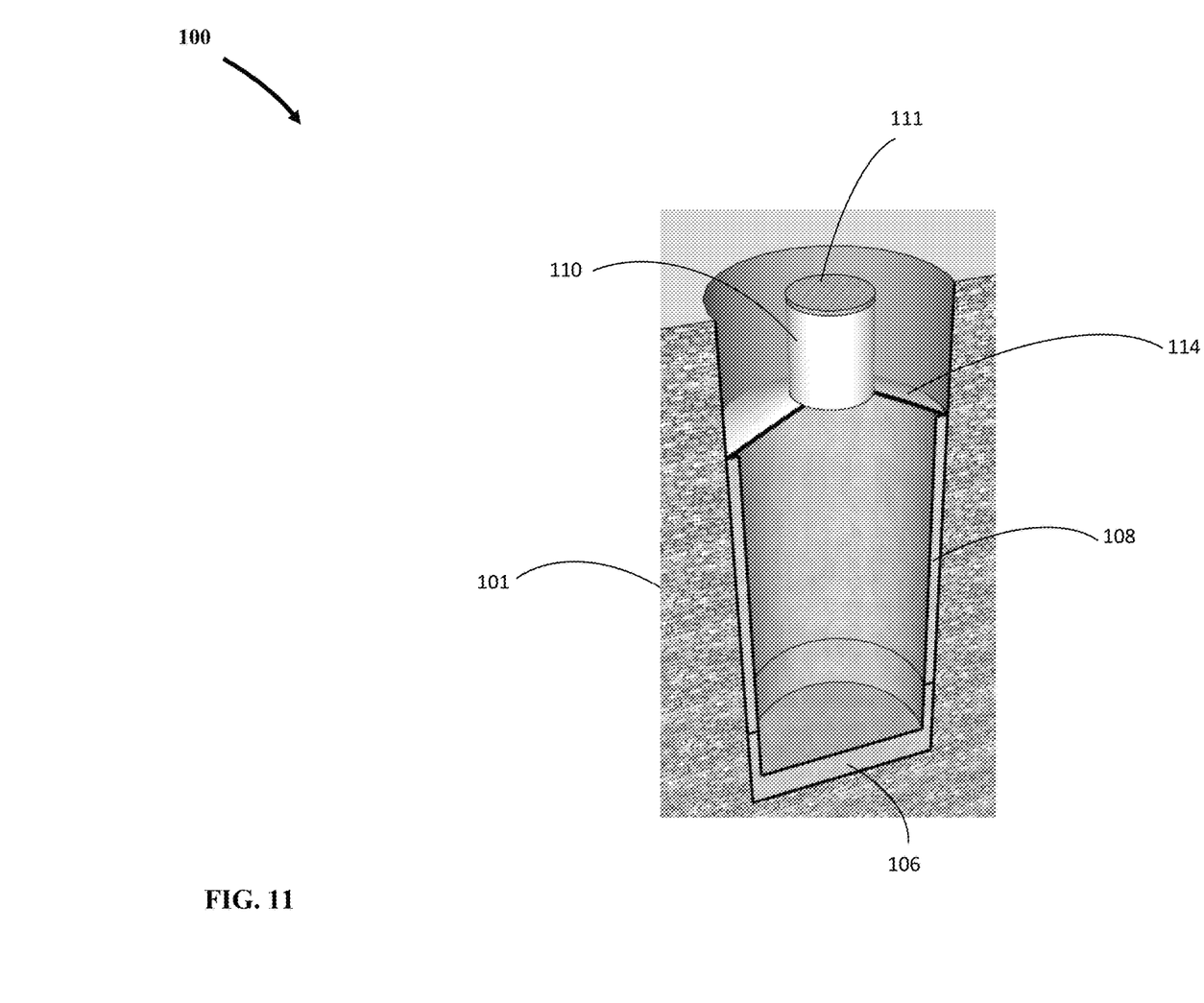
FIG. 11 shows alternative method that uses conical shaped structural silo roof.

FIG. 11 shows alternative method of continuing construction of silo 100 from stage shown in FIG. 5, wherein conical shaped structural silo roof 114 is used in lieu of flat roof 109 of FIG. 6. With this alternative the next step in construction is backfilling as shown in FIG. 8 but with conical support underneath.

Figure 12A:
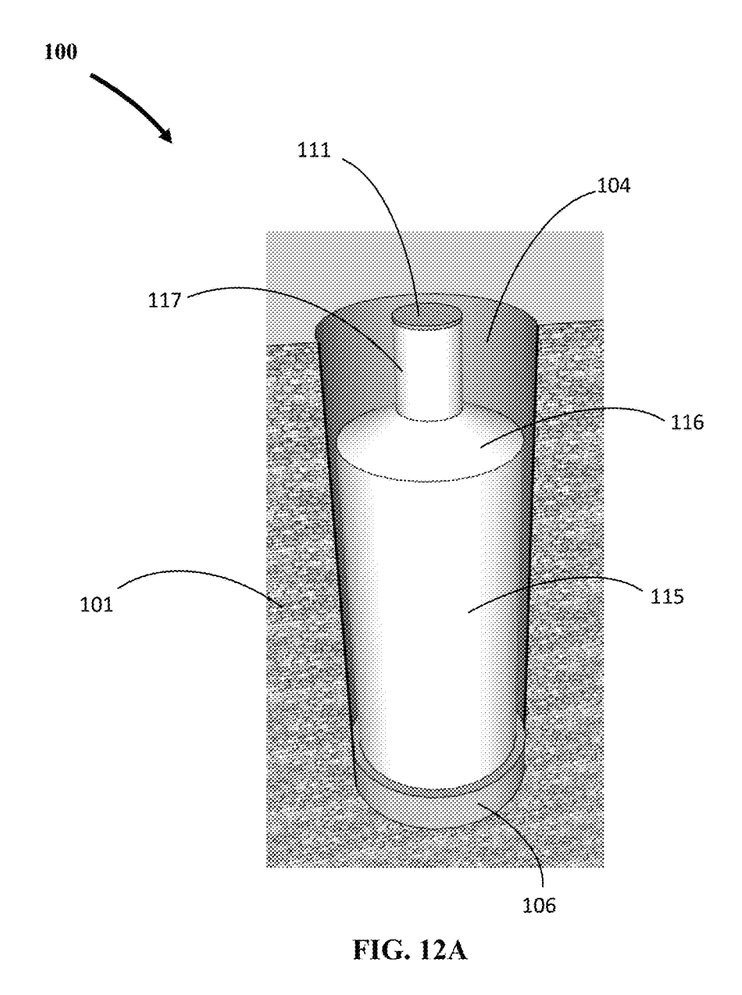
FIG. 12A shows alternative method that uses cylindrical form pre-fitted with conical shaped roof and access, when placed on foundation concrete.
Figure 12B:
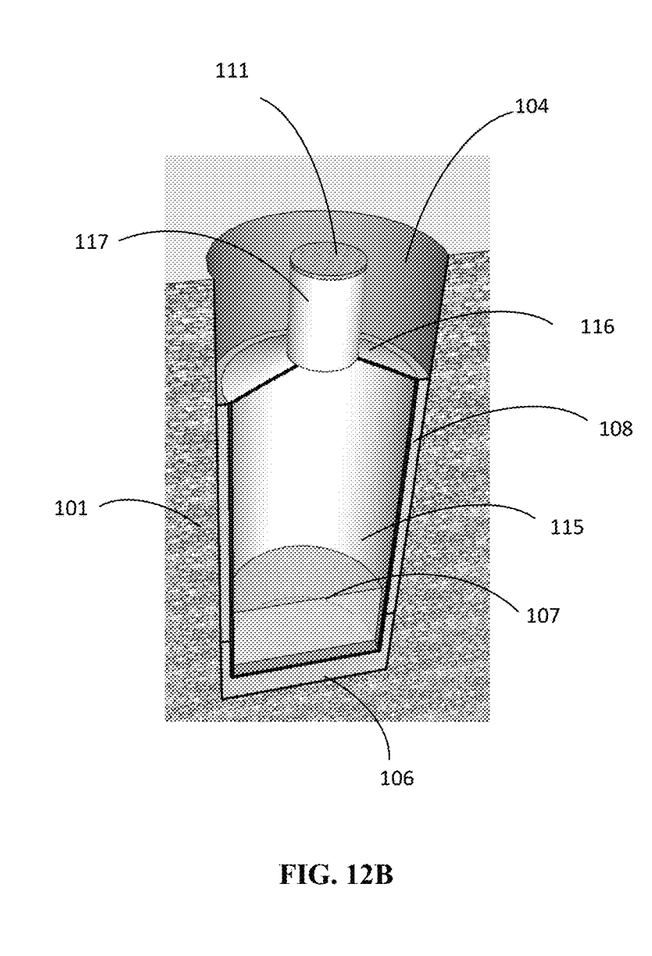
FIG. 12B shows cylindrical form pre-fitted with conical shaped roof and access, with annulus filled with concrete.

FIG. 12A shows alternative method in which sacrificial cylindrical form 115, pre-fitted with conical shaped roof 116 and access 117, has been placed on foundation concrete 106 in lieu of removable open-top form 105 shown FIGS. 1 through 5. FIG. 12B shows annulus between vertical hole 104 and cylindrical form 115 filled with poured wet silo wall concrete 108 up to top of cylindrical form 115 at base of conical shaped roof 116. With this alternative method, length of form 115 must be exactly same as height of silo wall, and the next step in construction is backfilling as shown in FIG. 8 but with conical support underneath.

The present invention is susceptible to modifications and variations which may be introduced thereto without departing from the inventive concepts and the object of the invention. These may include cylindrical forms that incorporate various means for establishing and facilitating lateral connections to the silo for water inflow and outflow, other forms and shapes of silo roof, and different backfill configurations and details at ground surface other than those disclosed.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A method for constructing an underground silo, the method comprising:
   a drilling rig disposed to drill at least one vertical cylindrical hole underground having a diameter measuring the same as an outside diameter of said underground silo;
   wet concrete poured at a bottom of said vertical hole underground;
   a closed-bottom, open-top, removable cylindrical form with an outside diameter measuring same as an inside diameter of said underground silo, and a length measuring at least the same as a wall height of said underground silo, said removable cylindrical form centered on said vertical hole and placed on top of said wet concrete;
   water poured inside said removable cylindrical form disposed to sink said removable cylindrical form inside said wet concrete to a desired level;
   wet concrete poured in an annulus between said vertical hole underground and said removable cylindrical form up to a desired level, disposed to function as said wall of said underground silo once set;
   a structural roof equipped with an access means into said underground silo placed on top of said wall of said underground silo once said removable form has been removed;
   backfill placed and compacted on top of said structural roof up to a ground surface.

2. A method for constructing an underground silo, the method comprising:
   a drilling rig disposed to drill at least one vertical cylindrical hole underground having a diameter measuring the same as an outside diameter of said underground silo;
   wet concrete poured at a bottom of said vertical hole underground;
   a closed-bottom removable cylindrical form with an outside diameter measuring the same as an inside diameter of said underground silo, and a length measuring at least the same as a wall height of said underground silo, said removable cylindrical form centered on said vertical hole and placed on top of said wet cement;
   a means to sink said removable cylindrical form inside said wet concrete to a desired level;
   a means to resist a buoyant force upon said cylindrical Formby the addition of wet concrete in an annulus between said vertical hole underground and said removable cylindrical form;
   wet concrete poured in said annulus between said vertical hole underground and said removable cylindrical form up to a desired level, disposed to function as said wall of said underground silo once set;
   a structural roof equipped with an access means into said underground silo placed on top of said wall of said underground silo once said removable form has been removed;
   backfill placed and compacted on top of said structural roof up to a ground surface.

* * * * *